(12) United States Patent
Mizuno et al.

(10) Patent No.: US 11,740,121 B2
(45) Date of Patent: Aug. 29, 2023

(54) WEIGHT CHECKER STRUCTURE WITH SLIDABLE SCREEN

(71) Applicant: ISHIDA CO., LTD., Kyoto (JP)

(72) Inventors: Emi Mizuno, Ritto (JP); Heinosuke Shiotani, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 204 days.

(21) Appl. No.: 17/364,767

(22) Filed: Jun. 30, 2021

(65) Prior Publication Data

US 2022/0042841 A1 Feb. 10, 2022

(30) Foreign Application Priority Data

Aug. 5, 2020 (JP) ................................ 2020-133280

(51) Int. Cl.
*G01G 21/28* (2006.01)
*G01G 21/23* (2006.01)
*G01G 11/00* (2006.01)

(52) U.S. Cl.
CPC ........... *G01G 21/28* (2013.01); *G01G 11/003* (2013.01); *G01G 21/23* (2013.01)

(58) Field of Classification Search
CPC ........ G01G 1/00; G01G 11/003; G01G 21/23; G01G 21/28
See application file for complete search history.

(56) References Cited

U.S. PATENT DOCUMENTS

| 7,626,130 | B2 * | 12/2009 | Scholpp | G01G 21/28 |
| | | | | 177/244 |
| 8,309,866 | B2 * | 11/2012 | Takahashi | G01G 11/00 |
| | | | | 177/126 |
| 2010/0212973 | A1 | 8/2010 | Takahashi et al. | |
| 2015/0352596 | A1 | 12/2015 | Yamakawa | |

FOREIGN PATENT DOCUMENTS

| EP | 2204642 B1 | 6/2018 |
| JP | 6062745 B2 | 1/2017 |
| WO | 2009057426 A1 | 5/2009 |

OTHER PUBLICATIONS

The extended European search report in the corresponding European Patent Application No. 21187389.8 dated Dec. 7, 2021.

* cited by examiner

*Primary Examiner* — Randy W Gibson
(74) *Attorney, Agent, or Firm* — Global IP Counselors, LLP

(57) ABSTRACT

A weight checker includes a transport unit, a weighing unit, a body, and a frame. The transport unit transports products under inspection. The weighing unit determines the weights of the products under inspection on the transport unit. The body has a screen relating to the weighing performed by the weighing unit. The frame anchors the transport unit and the weighing unit. The frame has rail members that extend in a transport direction of the transport unit. The body is independent of the transport unit and the weighing unit and is mounted to the rail members such that its position in the transport direction TD can be changed.

6 Claims, 13 Drawing Sheets

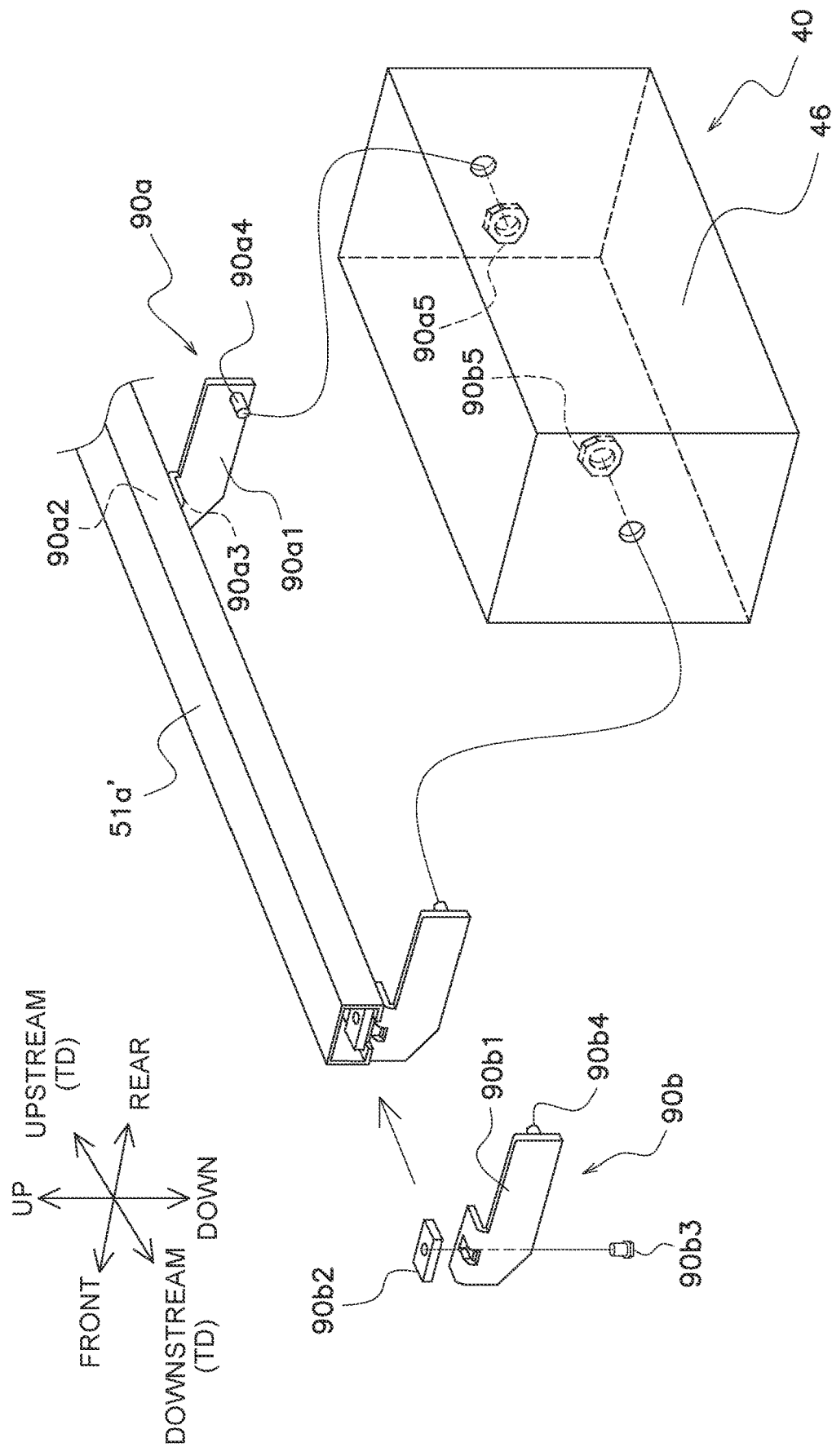
F I G. 11

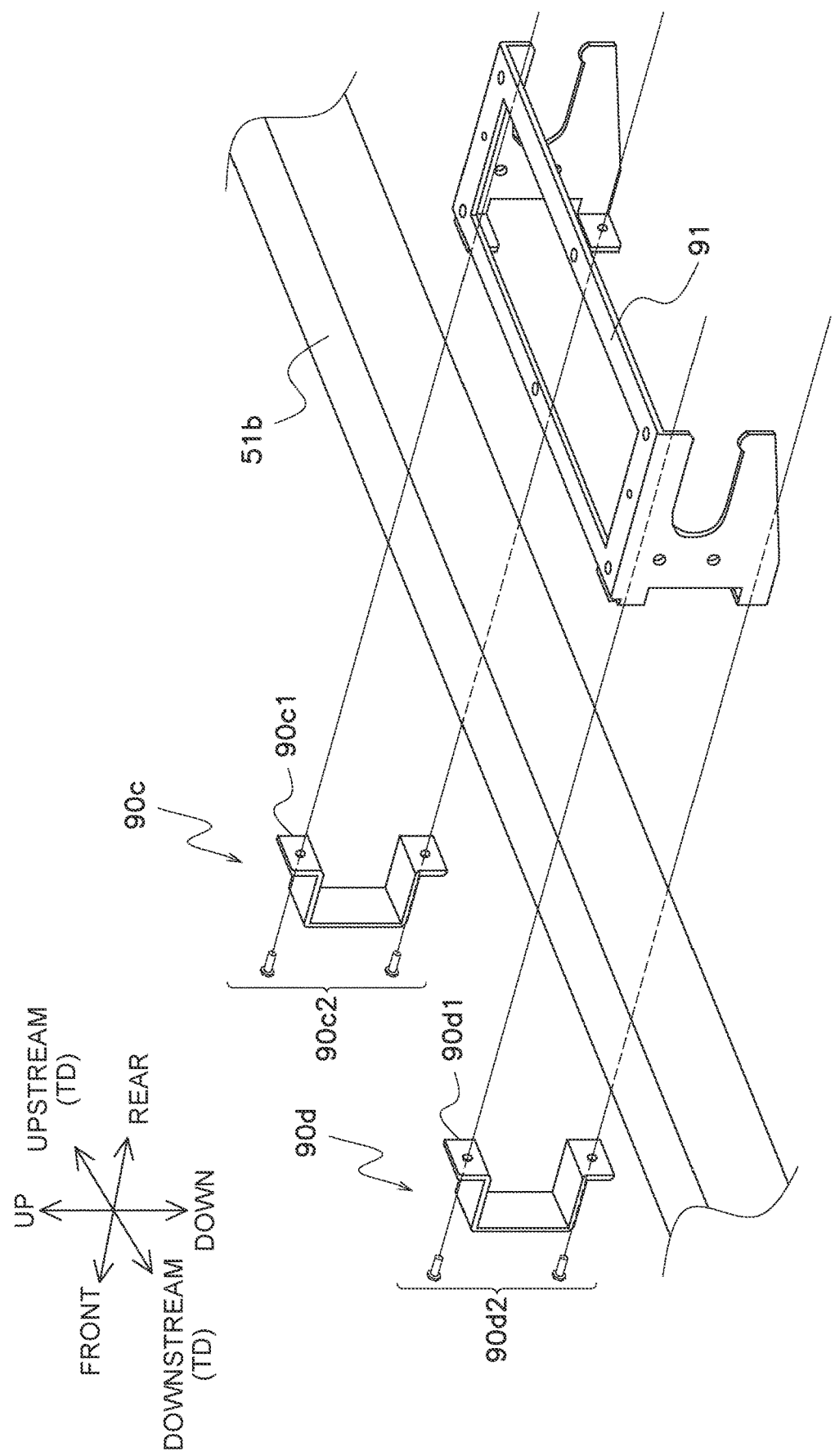
F I G. 12

WEIGHT CHECKER STRUCTURE WITH SLIDABLE SCREEN

TECHNICAL FIELD

This invention relates to a weight checker.

RELATED ART

As described in Japanese Patent No. 6,062,745, in a conventional weight checker, a body is anchored to a frame in such a way that its position basically cannot be changed.

SUMMARY OF THE INVENTION

Technical Problem

In the weight checker of patent literature 1, there is the problem that in a case where there is a structure in the location where the body should normally be placed, the user needs to take an action such as disassembling the body from the frame and putting the body in a separate place, which incurs a greater burden and expense than normal.

Solution to Problem

A weight checker of a first aspect includes a transport unit, a weighing unit, a body, and a frame. The transport unit transports products under inspection. The weighing unit determines the weights of the products under inspection on the transport unit. The body has a screen relating to the weighing performed by the weighing unit. The frame anchors the transport unit and the weighing unit. The frame has rail members that extend in a transport direction of the transport unit. The body is independent of the transport unit and the weighing unit and is mounted to the rail members in such a way that its position in the transport direction can be changed.

In the weight checker of the first aspect, the body is independent of the transport unit and the weighing unit and is mounted to the rail members in such a way that its position in the transport direction can be changed. As a result, even in a case where there is a structure in the location where the body should normally be placed, the weight checker can be installed without incurring any burden or expense by changing the position of the body in the transport direction.

A weight checker of a second aspect is the weight checker of the first aspect, wherein the position of the body in the transport direction can be changed by sliding the body in the transport direction in a state in which the load of the body is applied to the rail members.

In the weight checker of the second aspect, the position of the body in the transport direction can be changed by sliding the body in the transport direction in a state in which the load of the body is applied to the rail members. As a result, the position of the body can be easily changed by sliding the body in the transport direction.

A weight checker of a third aspect is the weight checker of the second aspect, wherein the body becomes slidable in the transport direction in response to loosening anchors that anchor the body to the rail members. The body is prevented from sliding in the transport direction by tightening the anchors.

In the weight checker of the third aspect, the body becomes slidable in the transport direction by loosening the anchors that anchor the body to the rail members. The body is prevented from sliding in the transport direction by tightening the anchors. As a result, the body can be easily adjusted to be slidable or fixed in position using the anchors.

A weight checker of a fourth aspect is the weight checker of any of the first aspect to the third aspect, wherein the frame has, as the rail members, a first rail member and a second rail member that are disposed parallel to each other and one above the other.

In the weight checker of the fourth aspect, the frame has, as the rail members, the first rail member and the second rail member that are disposed parallel to each other and one above the other. As a result, the body can be better stabilized by mounting the body to the two rail members that are disposed parallel to each other and one above the other.

A weight checker of a fifth aspect is the weight checker of any of the first aspect to the fourth aspect, wherein the frame further has a support member that supports the transport unit and the weighing unit separately from the rail members.

In the weight checker of the fifth aspect, the frame further has the support member that supports the transport unit and the weighing unit separately from the rail members. As a result, the position of the body in the transport direction can be changed irrespective of the transport unit and the weighing unit.

A weight checker of a sixth aspect is the weight checker of any of the first aspect to the fifth aspect, wherein the length of the rail members is greater than twice the length of the body in the transport direction.

In the weight checker of the sixth aspect, the length of the rail members is greater than twice the length of the body in the transport direction. As a result, in a case where two of the weight checkers are installed back to back, space can be saved by lining up their two bodies in the transport direction.

A weight checker of a seventh aspect is the weight checker of any of the first aspect to the sixth aspect, wherein the position of the body can be changed in the height direction of the body relative to the transport unit, the weighing unit, and the rail members.

In the weight checker of the seventh aspect, the position of the body can be changed in the height direction of the body relative to the transport unit, the weighing unit, and the rail members. As a result, the height of the screen relating to weighing that the body has can be easily changed.

Advantageous Effects of Invention

In the weight checker, the position of the body in the transport direction can be easily changed.

BRIEF DESCRIPTION OF THE DRAWINGS

FIG. 11 is a drawing showing the method of mounting the body to a rail member in example modification 1B.

FIG. 12 is a drawing showing the method of mounting the body to a rail member in example modification 1B.

DETAILED DESCRIPTION (1) Overall Configuration

Below, when describing directions and positional relationships, the expressions "front," "rear," "up," "down," "upstream," and "downstream" are sometimes used, and unless otherwise specified the expressions "front," "rear," "up," "down," "upstream," and "downstream" are used in accordance with the arrows in FIG. 1 and other drawings.

Figure 1:
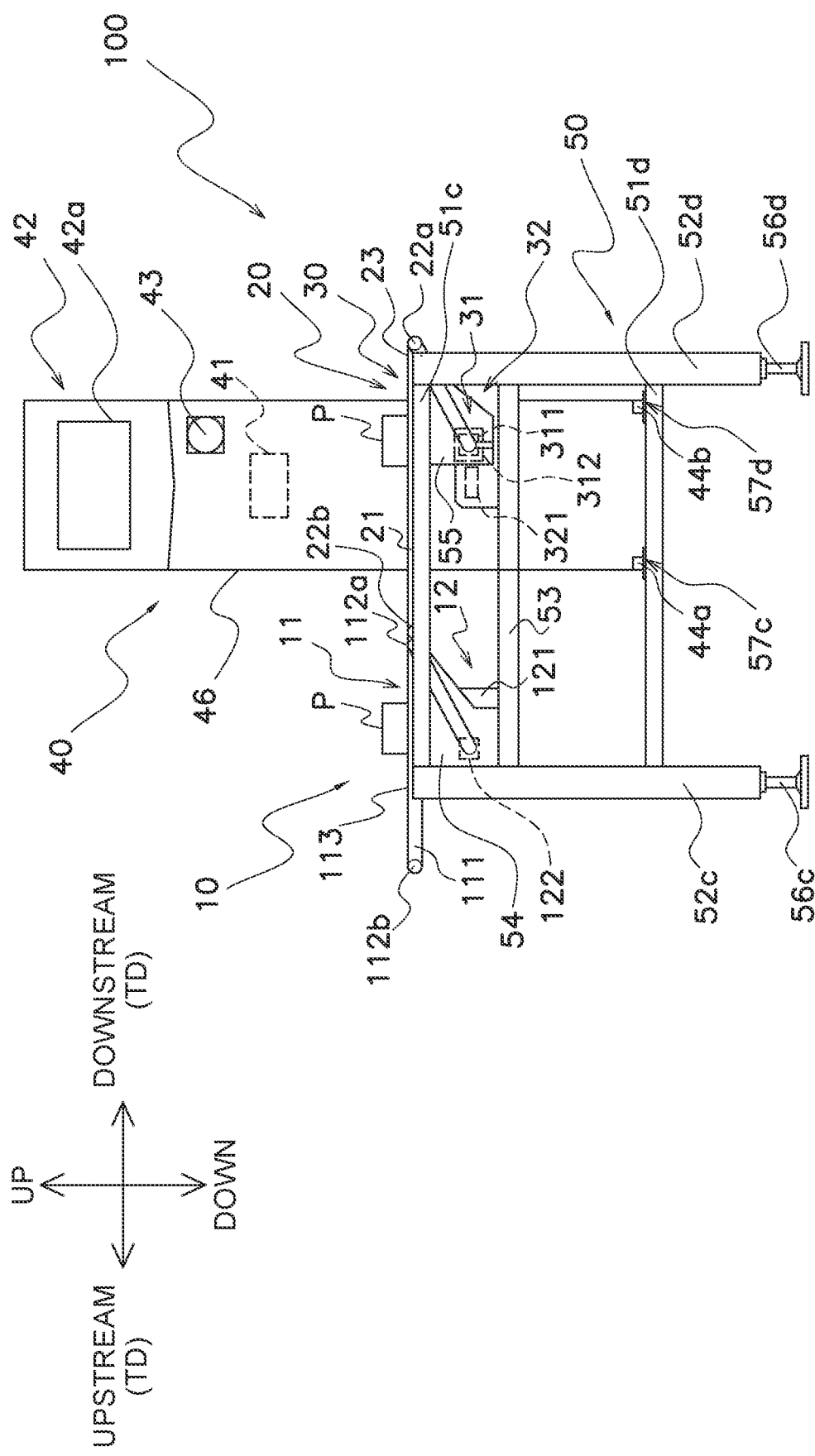
FIG. 1 is a front view of a weight checker.
Figure 2:
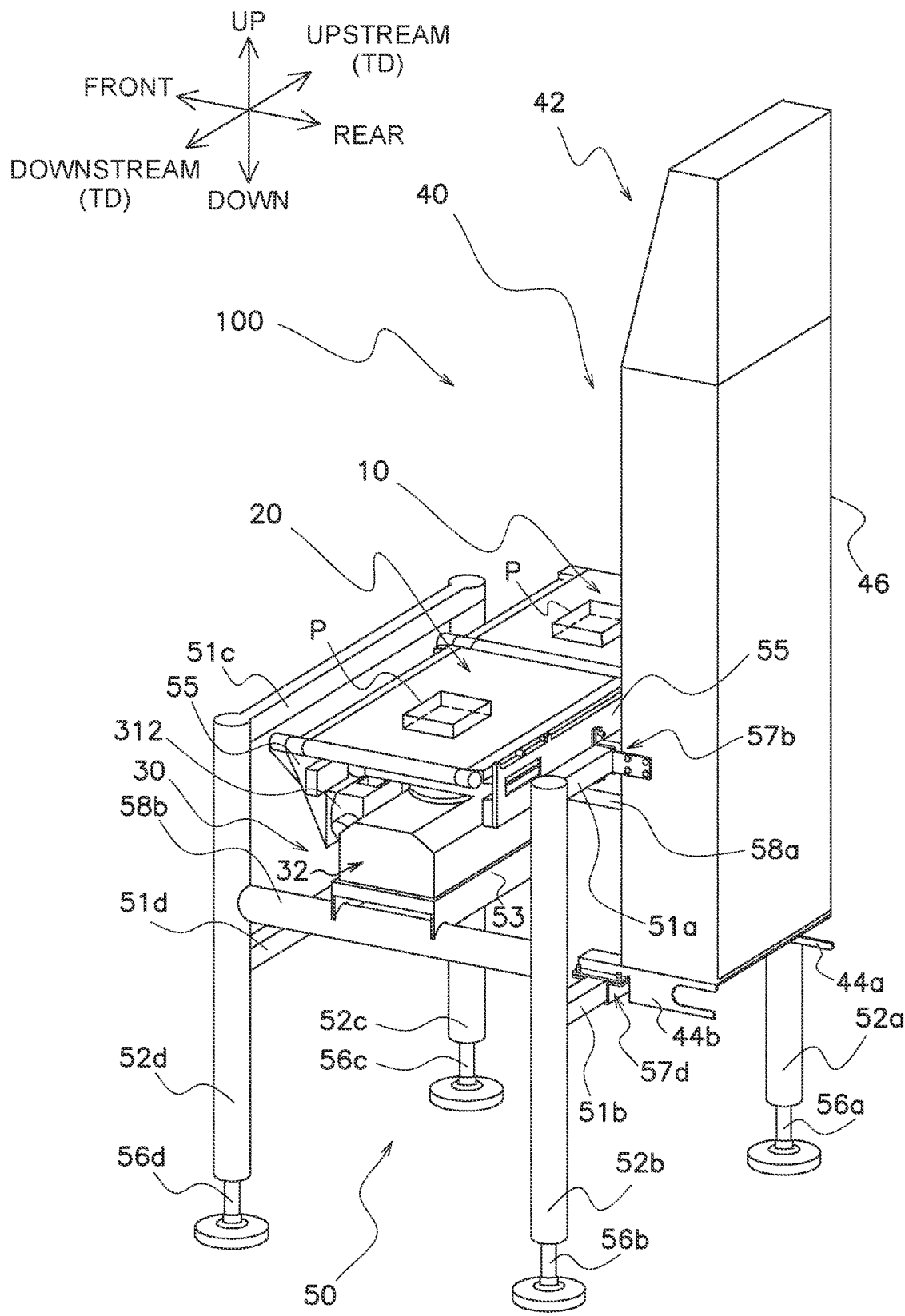
FIG. 2 is a perspective view of the weight checker.

FIG. 1 is a front view of a weight checker 100. FIG. 2 is a perspective view of the weight checker 100. As shown in FIG. 1 and FIG. 2, the weight checker 100 checks whether or not the weights of products under inspection P flowing from upstream to downstream are within an allowable range. Below, the upstream and downstream direction will be called a transport direction TD.

The weight checker 100 mainly includes a transport unit 20, a weighing unit 30, a body 40, and a frame 50.

(2) Detailed Configuration (2-1) Intake Unit

As shown in FIG. 1 and FIG. 2, an intake unit 10 receives from upstream the products under inspection P and transports the products under inspection P to the weighing unit 30 located downstream. The intake unit 10 has an intake conveyor 11 and a drive unit 12.

The intake conveyor 11 transports the products under inspection P. The intake conveyor 11 has a conveyor frame 111, a drive roller 112a and a follower roller 112b, and a transport belt 113. The conveyor frame 111 is supported by a pair of support members 54 disposed on the front side and the rear side of the intake conveyor 11. The drive roller 112a and the follower roller 112b are rotatably attached to the upstream side and the downstream side of the conveyor frame 111 in the transport direction TD. The transport belt 113 is an endless belt wound between the drive roller 112a and the follower roller 112b.

The drive unit 12 drives the intake conveyor 11. The drive unit 12 has a drive motor 122 and a motor box 121. The drive motor 122 causes the drive roller 112a to rotate. The motor box 121 houses the drive motor 122. The motor box 121 is anchored to the support members 54. When the drive motor 122 is activated, the driving force of the drive motor 122 is transmitted via a timing belt not shown in the drawings to the drive roller 112a and causes the drive roller 112a to primarily rotate. Because of this, the transport belt 113 revolves between the drive roller 112a and the follower roller 112b, and the products under inspection P on the transport belt 113 are transported to the weighing unit 30.

(2-2) Transport Unit

As shown in FIG. 1 and FIG. 2, the transport unit 20 transports the products under inspection P. The transport unit 20 is a weigh conveyor for transporting downstream the products under inspection P that it has received from the intake unit 10.

The transport unit 20 has a conveyor frame 21, a drive roller 22a and a follower roller 22b, and a transport belt 23.

The conveyor frame 21 is supported by a pair of support members 55 disposed on the front side and the rear side of the transport unit 20. The drive roller 22a and the follower roller 22b are rotatably attached to the upstream side and the downstream side of the conveyor frame 21 in the transport direction TD. The transport belt 23 is an endless belt wound between the drive roller 22a and the follower roller 22b.

The transport unit 20, together with the weighing unit 30, is supported by a support member 53 of the frame 50.

(2-3) Weighing Unit

As shown in FIG. 1 and FIG. 2, the weighing unit 30 determines the weights of the products under inspection P on the transport unit 20.

The weighing unit 30 has a drive unit 31 and a weighing box 32.

The drive unit 31 drives the transport unit 20. The drive unit 31 has a drive motor 311 and a motor box 312. The drive motor 311 causes the drive roller 22a to rotate. The motor box 312 houses the drive motor 311. The motor box 312 is anchored to the support members 55. When the drive motor 311 inside the motor box 312 is activated, the driving force of the drive motor 311 is transmitted via a timing belt not shown in the drawings to the drive roller 22a and causes the drive roller 22a to primarily rotate. Because of this, the transport belt 23 revolves between the drive roller 22a and the follower roller 22b, and the products under inspection P on the transport belt 23 are transported downstream.

The weighing box 32 is supported by the support member 53 of the frame 50. The weighing box 32 houses a load cell 321. The load cell 321 detects changes in strain caused by the products under inspection P being placed on the transport unit 20, and thereby determines the weights of the products under inspection P that have been placed on the transport unit 20.

(2-4) Body

As shown in FIG. 1 and FIG. 2, the body 40 is disposed in back of the weighing unit 30.

The body 40 has a trunk portion 46, a control unit 41, a display 42, a power switch 43, and mounting brackets 44a, 44b.

The trunk portion 46 is a vertically long casing that extends in the up and down direction.

The control unit 41 is housed inside the trunk portion 46. The control unit 41 controls the operation of each part of the weight checker 100. The control unit 41 is, for example, configured by a computer having a CPU and a memory, and is electrically connected to the drive motors 122, 311, etc. The control unit 41 controls the operation of the drive motors 122, 311. Furthermore, the control unit 41 receives weigh signals output from the load cell 321 and determines whether or not the weight values represented by the weigh signals are within the predetermined allowable range.

The display 42 is installed, with its screen 42a facing forward, in the upper portion of the body 40. On the screen 42a of the display 42 is displayed content relating to the weighing performed by the weighing unit 30. For example, on the screen 42a of the display 42 are displayed the result of the determinations in the control unit 41, etc.

The power switch 43 switches on and off the power of the weight checker 100.

The mounting brackets 44a, 44b are welded to both transport direction TD ends of the undersurface of the trunk portion 46. The mounting bracket 44a is welded to the upstream side. The mounting bracket 44b is welded to the downstream side. The mounting brackets 44a, 44b are used to anchor the body 40 to a rail member 51b.

(2-5) Frame

As shown in FIG. 1 and FIG. 2, the frame 50 has rail members 51a to 51d, leg members 52a to 52d, crossbeam members 58a, 58b, and the support member 53.

The rail members 51a to 51d extend in the transport direction TD of the transport unit 20. The rail members 51a to 51d include a rail member 51a (a first rail member 51a) and a rail member 51b (a second rail member 51b), which are disposed parallel to each other and one above the other in the up and down direction in back, and a rail member 51c and a rail member 51d, which are disposed parallel to each other and one above the other in the up and down direction in front. In this embodiment, the length of the rail members 51a to 51d is greater than twice the length of the body 40 in the transport direction TD.

Figure 3:
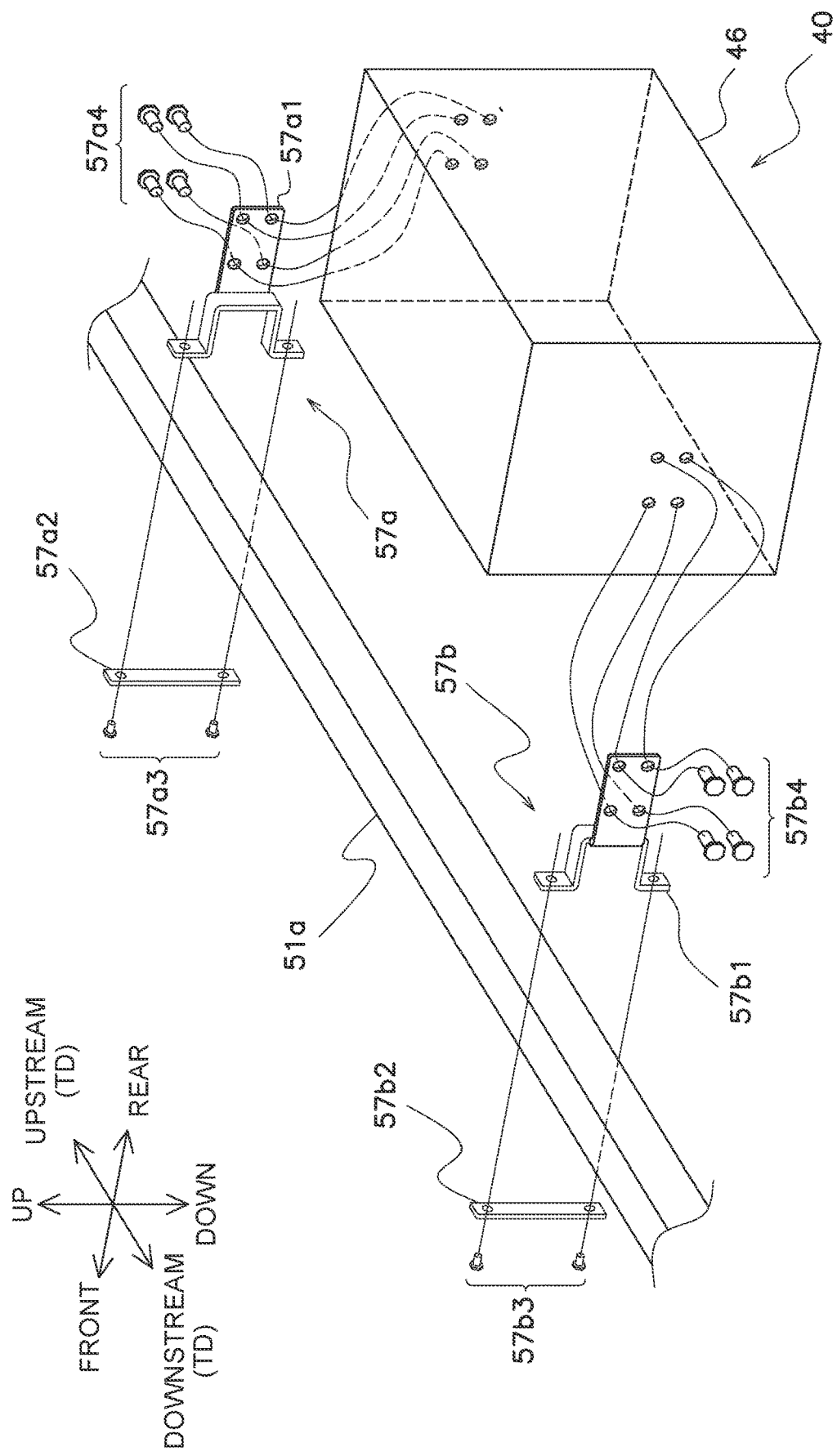
FIG. 3 is a drawing showing a method of mounting a body to a rail member.

The upstream and downstream side surfaces of the trunk portion 46 of the body 40 are mounted to the rail member 51a by anchors 57a, 57b. FIG. 3 is a drawing for describing the method of mounting the body 40 to the rail member 51a. As shown in FIG. 3, the anchor 57a has mounting members 57a1, 57a2 and screws 57a3, 57a4. The rail member 51a is sandwiched in the front and rear direction by the mounting member 57a1 and the mounting member 57a2. The mounting member 57a2 is screwed to the mounting member 57a1 by two screws 57a3 from front to back. The mounting member 57a1 is screwed to the upstream side surface of the trunk portion 46 by four screws 57a4 from upstream to downstream. Furthermore, the anchor 57b has mounting members 57b1, 57b2 and screws 57b3, 57b4. The rail member 51a is sandwiched in the front and rear direction by the mounting member 57b1 and the mounting member 57b2. The mounting member 57b2 is screwed to the mounting member 57b1 by two screws 57b3 from front to back. The mounting member 57b1 is screwed to the downstream side surface of the trunk portion 46 by four screws 57b4 from downstream to upstream.

Figure 4:
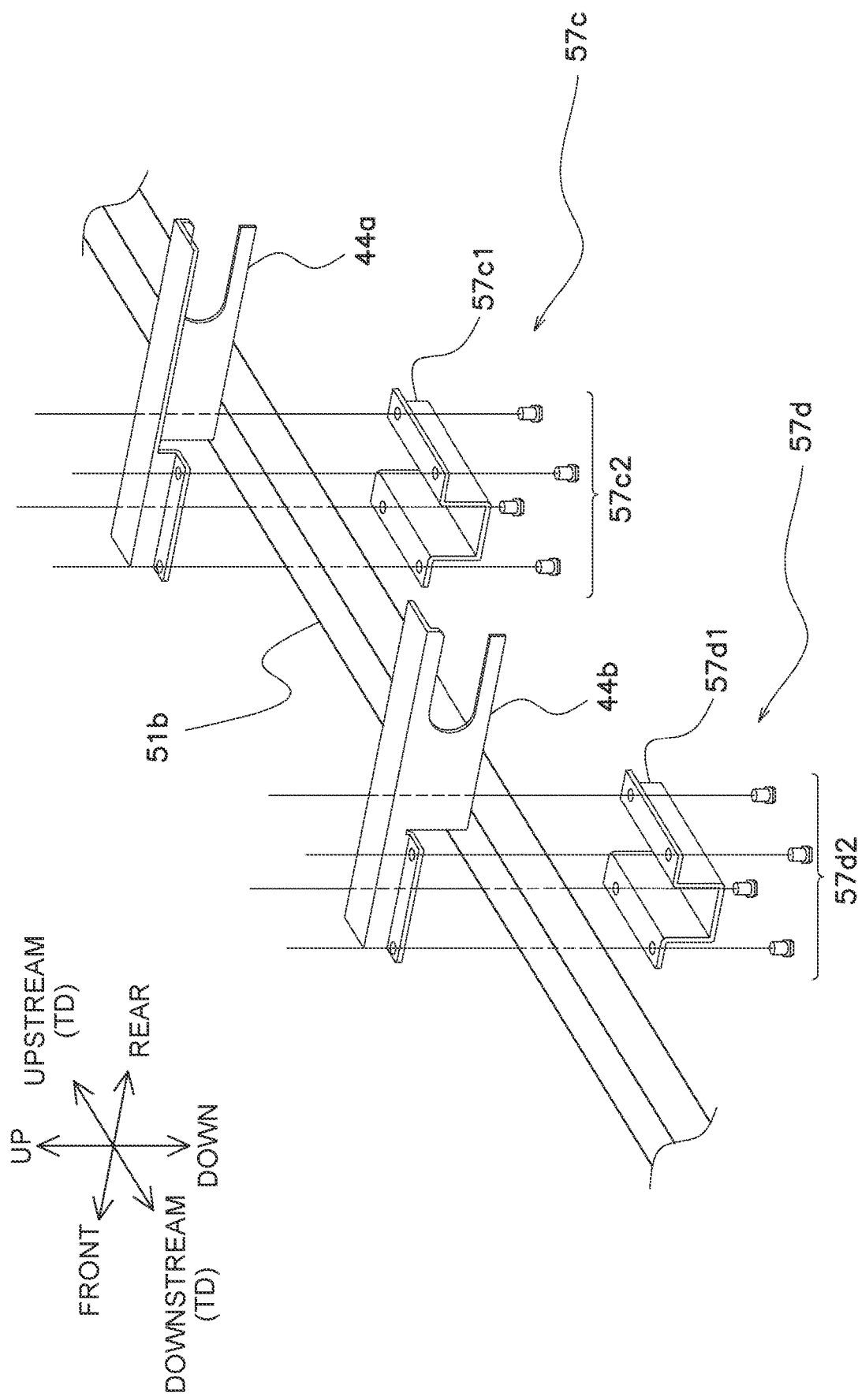
FIG. 4 is a drawing showing the method of mounting the body to a rail member.

The mounting brackets 44a, 44b of the body 40 are mounted to the rail member 51b by anchors 57c, 57d. FIG. 4 is a drawing for describing the method of mounting the body 40 to the rail member 51b. The anchor 57c has a mounting member 57c1 and screws 57c2. The rail member 51b is sandwiched in the up and down direction by the mounting bracket 44a and the mounting member 57c1. The mounting member 57c1 is screwed to the mounting bracket 44a by four screws 57c2 from below to above. It will be noted that FIG. 4 does not show the two screw holes on the upstream side of the mounting bracket 44a. Furthermore, the anchor 57d has a mounting member 57d1 and screws 57d2. The rail member 51b is sandwiched in the up and down direction by the mounting bracket 44b and the mounting member 57d1. The mounting member 57d1 is screwed to the mounting bracket 44b by four screws 57d2 from below to above. It will be noted that FIG. 4 does not show the two screw holes on the upstream side of the mounting bracket 44b.

The leg members 52a to 52d are welded to the upstream and downstream end portions of the rail members 51a to 51d. The leg members 52a to 52d include a leg member 52a and a leg member 52c, which are disposed parallel to each other and one in front of the other in the front and rear direction on the upstream side, and a leg member 52b and a leg member 52d, which are disposed parallel to each other and one in front of the other in the front and rear direction on the downstream side. Lower end portions of the leg members 52a to 52d come into contact with a floor surface and support the entire weight checker 100. The leg members 52a to 52d are provided with adjustment mechanisms 56a to 56d for adjusting the height of the lower end portions. By adjusting the adjustment mechanisms 56a to 56d of the leg members 52a to 52d, the height position and the horizontal state of the intake unit 10, the transport unit 20, and the weighing unit 30 can be adjusted.

The crossbeam members 58a, 58b extend in the front and rear direction. Both front and rear direction ends of the crossbeam member 58a are welded to the leg member 52a and the leg member 52c. Both front and rear direction ends of the crossbeam member 58b are welded to the leg member 52b and the leg member 52d. The crossbeam members 58a, 58b are welded to the leg members 52a to 52d at positions higher than the up and down direction midpoints of the leg members 52a to 52d.

The support member 53 extends in the transport direction TD. Both ends of the support member 53 bridge the crossbeam member 58a and the crossbeam member 58b. The support member 53 supports the intake unit 10, the transport unit 20, and the weighing unit 30.

(3) Changing the Position of the Body in the Transport Direction

As described above, the body 40 is independent of the transport unit 20 and the weighing unit 30 and is mounted to the rail members 51a, 51b in such a way that its position in the transport direction TD can be changed.

The body 40 becomes slidable in the transport direction TD in response to loosening the anchors 57a to 57d that anchor the body 40 to the rail members 51a, 51b. The body 40 becomes fixed in position relative to the frame 50 (not slidable) in the transport direction TD by tightening the anchors 57a to 57d. The position of the body 40 in the transport direction TD can be changed by sliding the body 40 in the transport direction TD in a state in which the load of the body 40 is applied to the rail member 51b.

Figure 5:
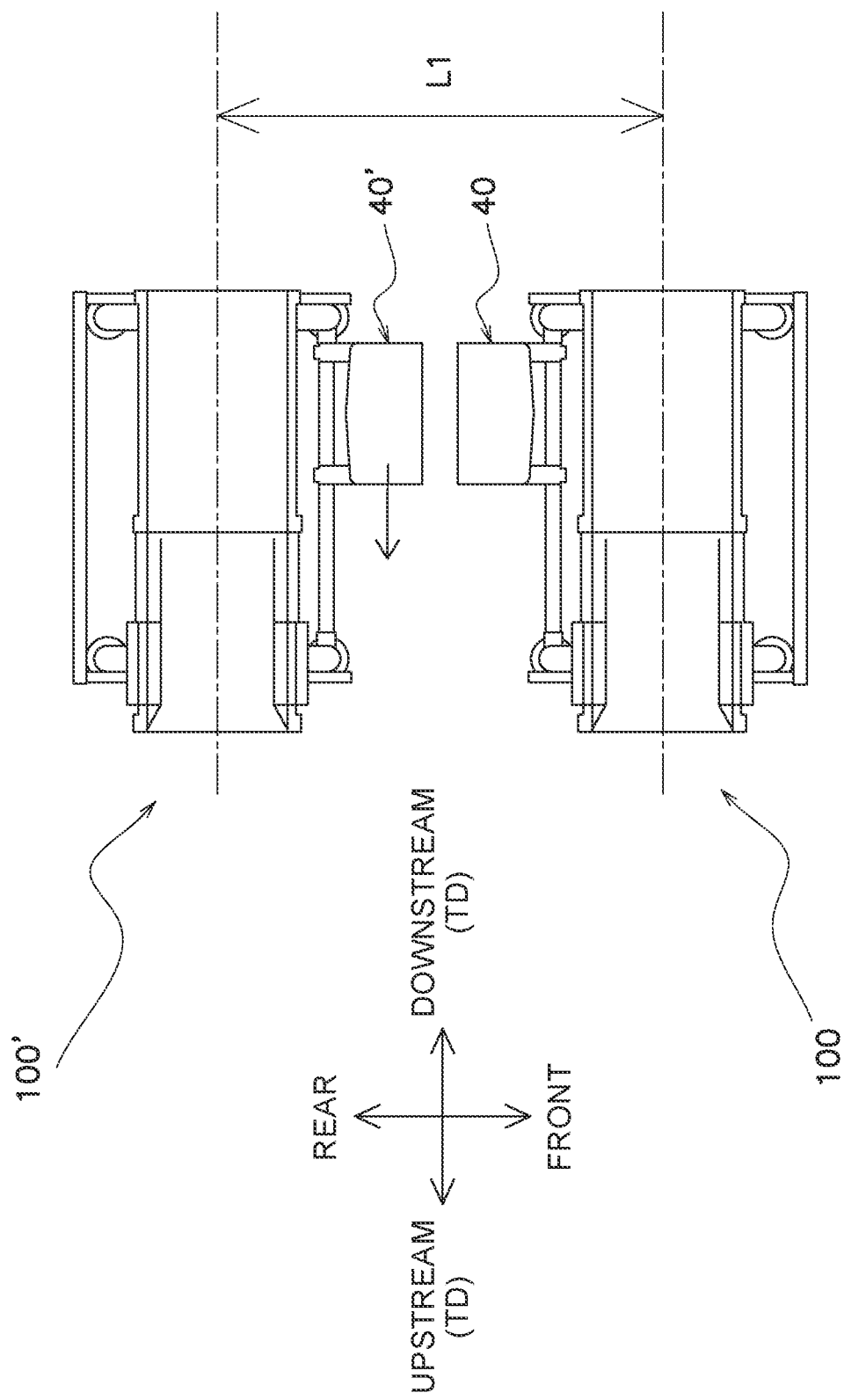
FIG. 5 is a drawing showing a case where two weight checkers are installed back to back.
Figure 6:
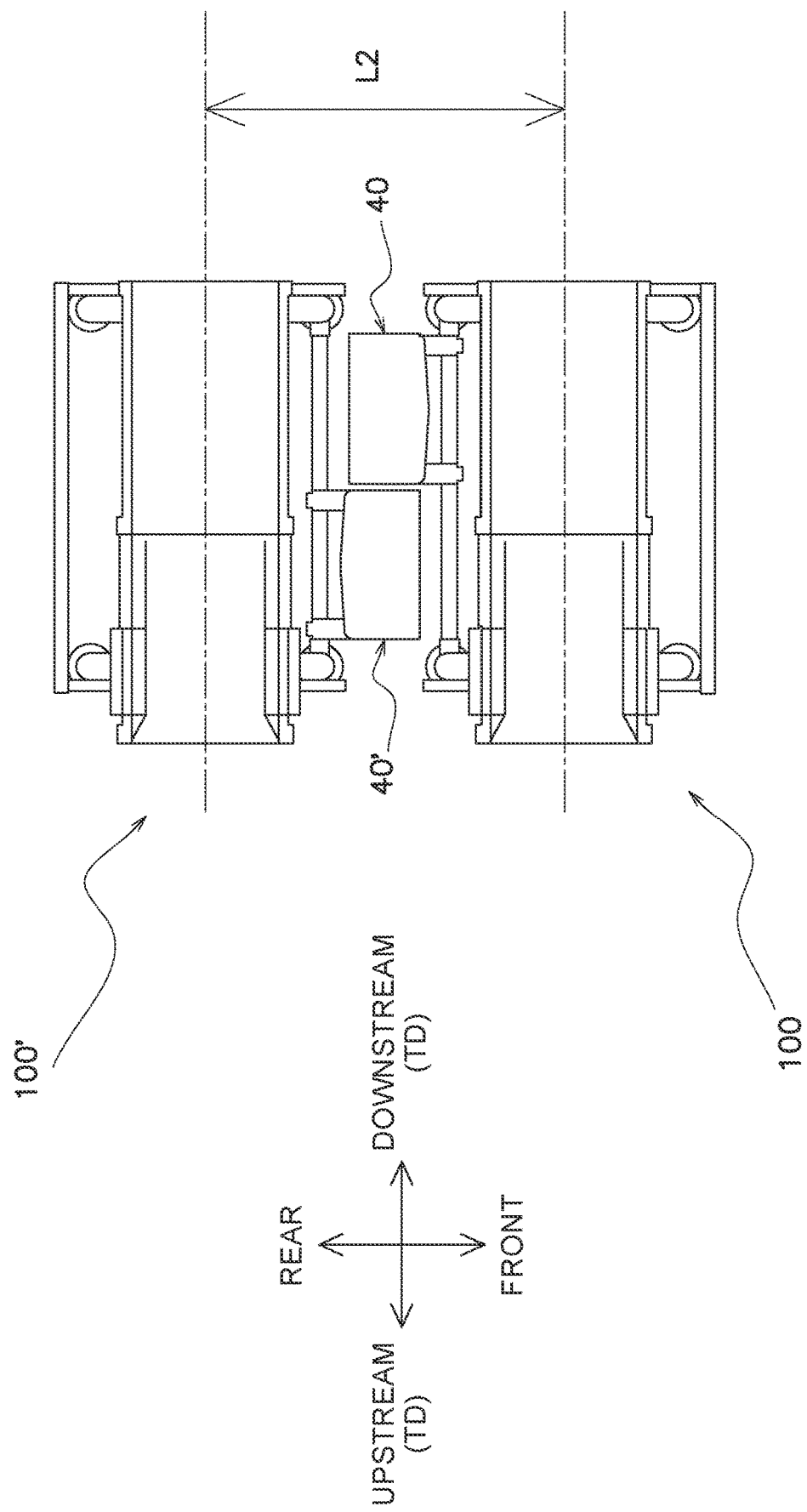
FIG. 6 is a drawing showing the case where the two weight checkers are installed back to back.

In this embodiment, the length of the rail members 51a to 51d is greater than twice the length of the body 40 in the transport direction TD. For that reason, in a case where two weight checkers 100, 100' are installed back to back, the two weight checkers 100, 100' can be installed in a space-saving manner by changing the positions of their bodies 40, 40' in the transport direction TD. FIG. 5 and FIG. 6 are drawings showing a case where the two weight checkers 100, 100' are installed back to back. FIG. 5 and FIG. 6 show the two weight checkers 100, 100' as viewed looking down on them from above. In FIG. 5, the two weight checkers 100, 100' are installed back to back in the front and rear direction. In FIG. 6, the position of the body 40' of the weight checker 100' of FIG. 5 is moved upstream, and the two weight checkers 100, 100' are moved closer to each other in the front and rear direction so that the two bodies 40, 40' are lined up in the transport direction TD. The result of an inspection showed that a distance L1 between the conveyors of the two weight checkers 100, 100' in FIG. 5 was 950 mm. A distance L2 between the conveyors of the two weight checkers 100, 100' in FIG. 6 was 785 mm. For that reason, it is apparent that the arrangement in FIG. 6 allows the two weight checkers 100, 100' to be installed in a manner that saves more space in the front and rear direction than the arrangement in FIG. 5.

(4) Characteristics (4-1)

In the conventional weight checker, the body has been anchored to the frame in such a way that its position basically cannot be changed.

For that reason, there has been the problem that in a case where there is a structure in the location where the body should normally be placed, the user needs to take an action such as disassembling the body from the frame and putting the body in a separate place, which incurs a greater burden and expense than normal.

In the weight checker 100 of this embodiment, the body 40 is independent of the transport unit 20 and the weighing unit 30 and is mounted to the rail members 51*a*, 51*b* in such a way that its position in the transport direction TD can be changed. As a result, even in a case where there is a structure in the location where the body 40 should normally be placed, the weight checker 100 can be installed without incurring any burden or expense by changing the position of the body 40 in the transport direction TD.

(4-2)

In the weight checker 100 of this embodiment, the position of the body 40 in the transport direction TD can be changed by sliding the body 40 in the transport direction TD in a state in which the load of the body 40 is applied to the rail member 51*b*. As a result, the position of the body 40 can be easily changed by sliding the body 40 in the transport direction TD.

(4-3)

In the weight checker 100 of this embodiment, the body 40 becomes slidable in the transport direction TD by loosening the anchors 57*a* to 57*d* that anchor the body 40 to the rail members 51*a*, 51*b*. The body 40 not slidable in the transport direction TD by tightening the anchors 57*a* to 57*d*. As a result, the body 40 can be easily adjusted to be slidable or fixed in position using the anchors 57*a* to 57*d*.

(4-4)

In the weight checker 100 of this embodiment, the frame 50 has, as the rail members 51*a* to 51*d*, the first rail member 51*a* and the second rail member 51*b* that are disposed parallel to each other and one above the other. As a result, the body 40 can be better stabilized by mounting the body 40 to the two rail members 51*a*, 51*b* that are disposed parallel to each other and one above the other.

(4-5)

In the weight checker 100 of this embodiment, the frame 50 further has the support member 53 that supports the transport unit 20 and the weighing unit 30 separately from the rail members 51*a* to 51*d*. As a result, the position of the body 40 in the transport direction TD can be changed irrespective of the transport unit 20 and the weighing unit 30.

(4-6)

In the weight checker 100 of this embodiment, the length of the rail members 51*a* to 51*d* is greater than twice the length of the body 40 in the transport direction TD. As a result, in a case where the two weight checkers 100, 100' are installed back to back, space can be saved by lining up their two bodies 40, 40' in the transport direction TD.

(5) Example Modifications (5-1) Example Modification 1A

In the embodiment, the body 40 is mounted to the rail members 51*a*, 51*b*, and the rail members 51*a*, 51*b* are welded to the leg members 52*a*, 52*b*. However, the rail members 51*a*, 51*b* may also be mounted to the leg members 52*a*, 52*b* in such a way that the position of the rail members 51*a*, 51*b* can be changed in the up and down direction. As a result, the position of the body 40 can be changed in the height direction of the body 40 relative to the transport unit 20, the weighing unit 30, and the rail members 51*c*, 51*d*.

Figure 7:
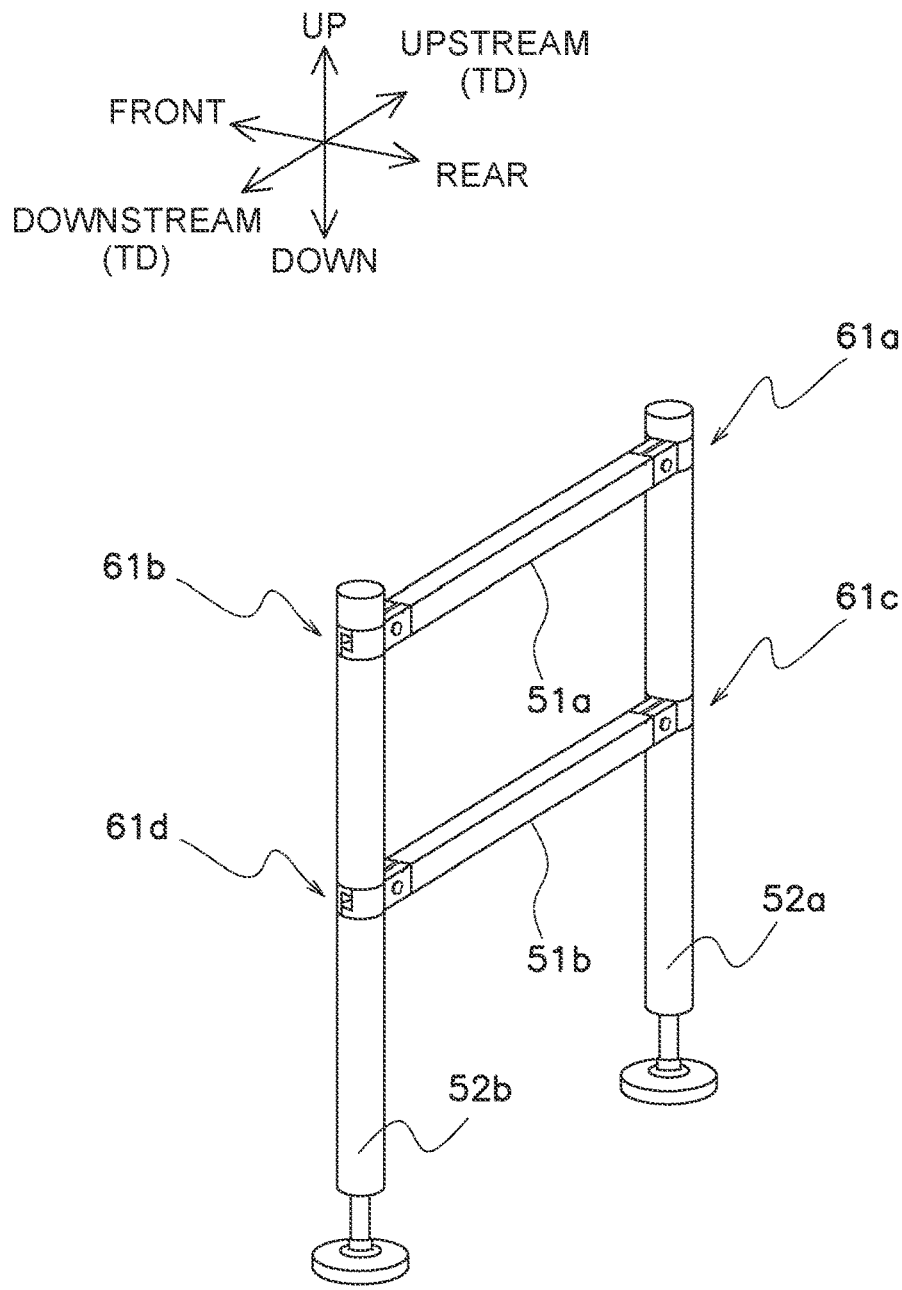
FIG. 7 is a drawing showing a case where the rail members are mounted to leg members using anchors.
Figure 8:
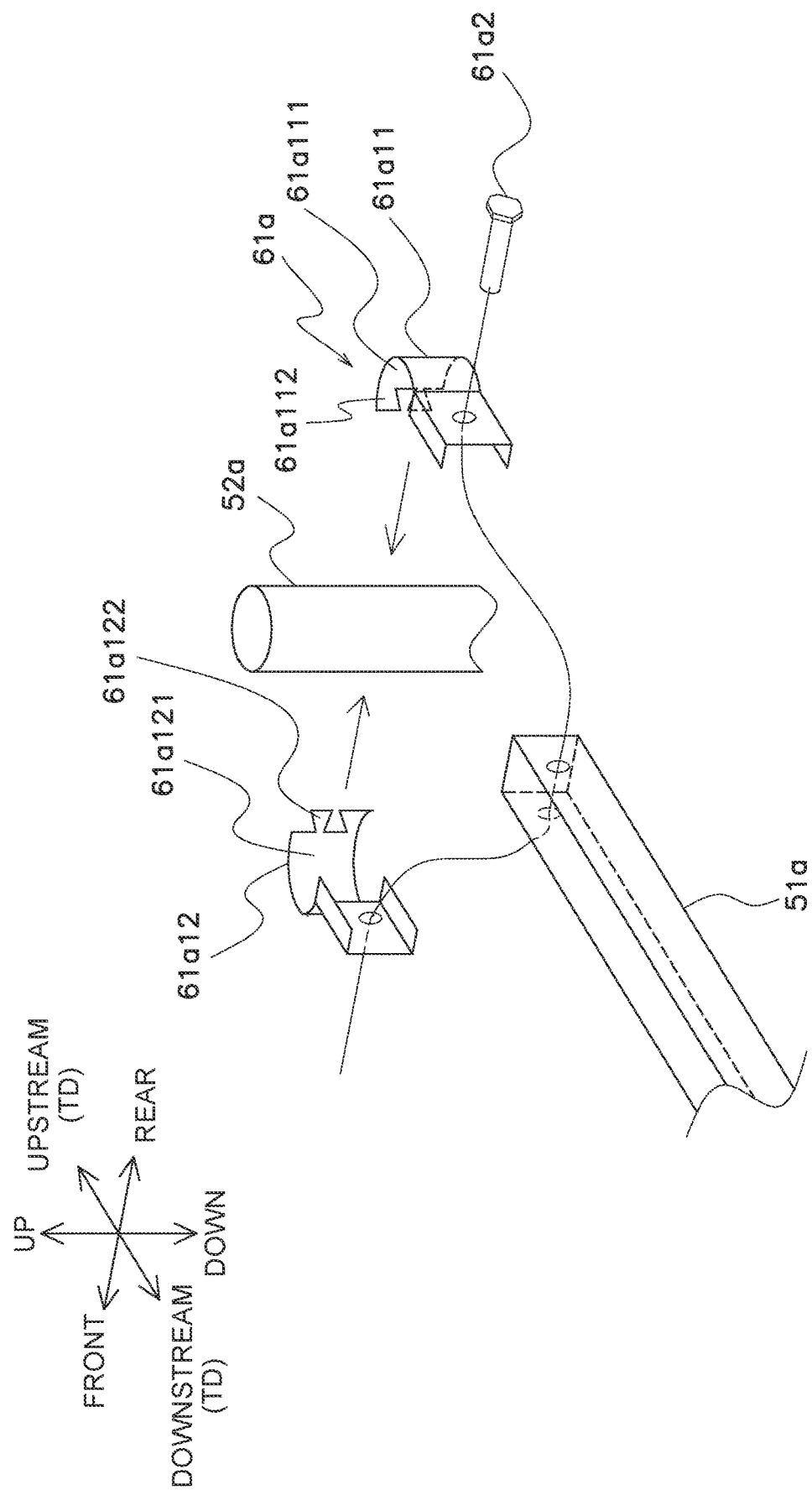
FIG. 8 is a drawing showing the case where the rail members are mounted to the leg members using the anchors.

FIG. 7 and FIG. 8 are drawings showing a case where the rail members 51*a*, 51*b* are mounted to the leg members 52*a*, 52*b* using anchors 61*a* to 61*d*. FIG. 7 shows a state after the rail members 51*a*, 51*b* have been mounted to the leg members 52*a*, 52*b* using the anchors 61*a* to 61*d*. The rail member 51*a* is mounted to the leg member 52*a* using the anchor 61*a*. The rail member 51*a* is mounted to the leg member 52*b* using the anchor 61*b*. The rail member 51*b* is mounted to the leg member 52*a* using the anchor 61*c*. The rail member 51*b* is mounted to the leg member 52*b* using the anchor 61*d*. FIG. 8 representatively shows the method of mounting the rail member 51*a* to the leg member 52*a* using the anchor 61*a*. The anchor 61*a* has a pair of mounting members 61*a*11, 61*a*12 and a screw 61*a*2. The mounting members 61*a*11, 61*a*12 have curved portions 61*a*111, 61*a*121 and projecting portions 61*a*112, 61*a*122. To mount the rail member 51*a* to the leg member 52*a*, first the leg member 52*a* is surrounded in the front and rear direction by the curved portion 61*a*111 of the mounting member 61*a*11 and the curved portion 61*a*121 of the mounting member 61*a*12. At this time, the projecting portion 61*a*112 of the mounting member 61*a*11 and the projecting portion 61*a*122 of the mounting member 61*a*12 become fitted and anchored to each other. Thereafter, the mounting members 61*a*11, 61*a*12 are screwed to the rail member 51*a* using the screw 61*a*2 from back to front.

As described above, when the rail members 51*a*, 51*b* are mounted to the leg members 52*a*, 52*b* using the anchors 61*a* to 61*d*, the position of the body 40 can be changed in the height direction of the body 40 relative to the transport unit 20, the weighing unit 30, and the rail members 51*c*, 51*d* by loosening the anchors 61*a* to 61*d*.

Figure 9:
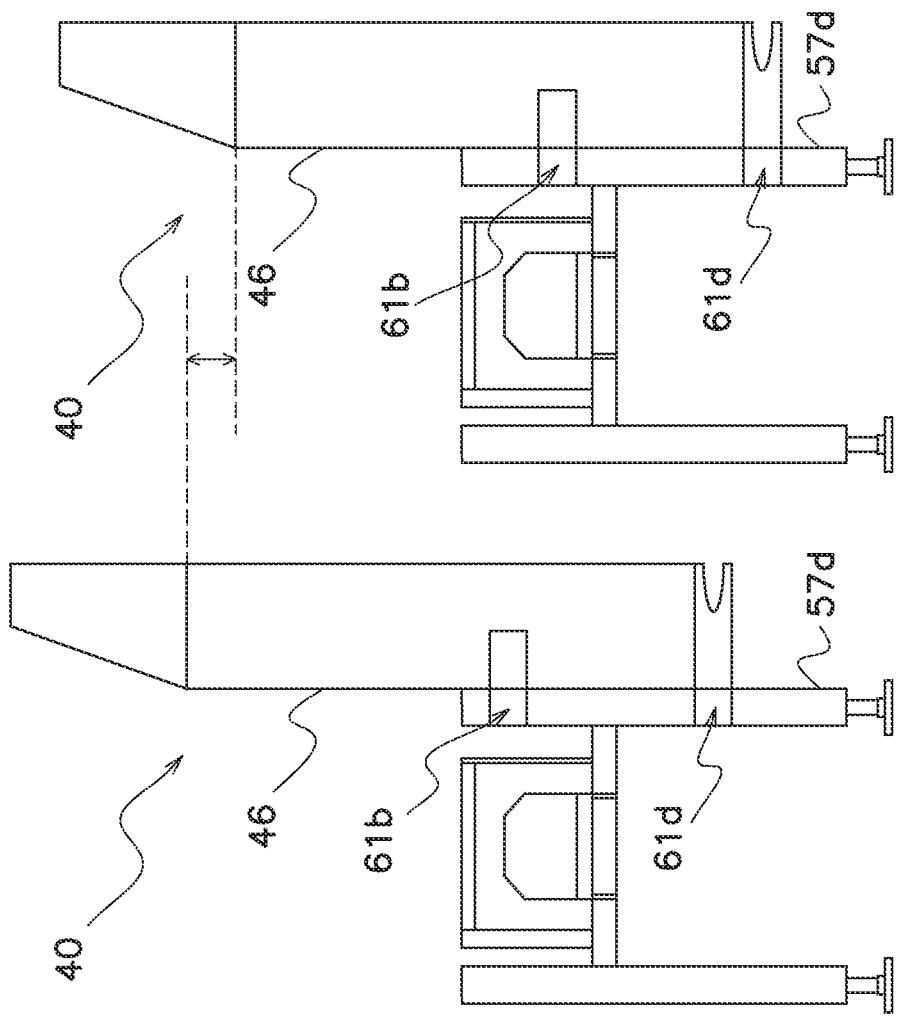
FIG. 9 is a side view showing the position of the body having been changed in the up and down direction.

FIG. 9 is a side view showing the position of the body 40 having been changed in the up and down direction. The left portion of FIG. 9 shows a case where the height of the body 40 has been raised, while the right portion of FIG. 9 shows a case where the height of the body 40 has been lowered.

(5-2) Example Modification 1B

Figure 10:
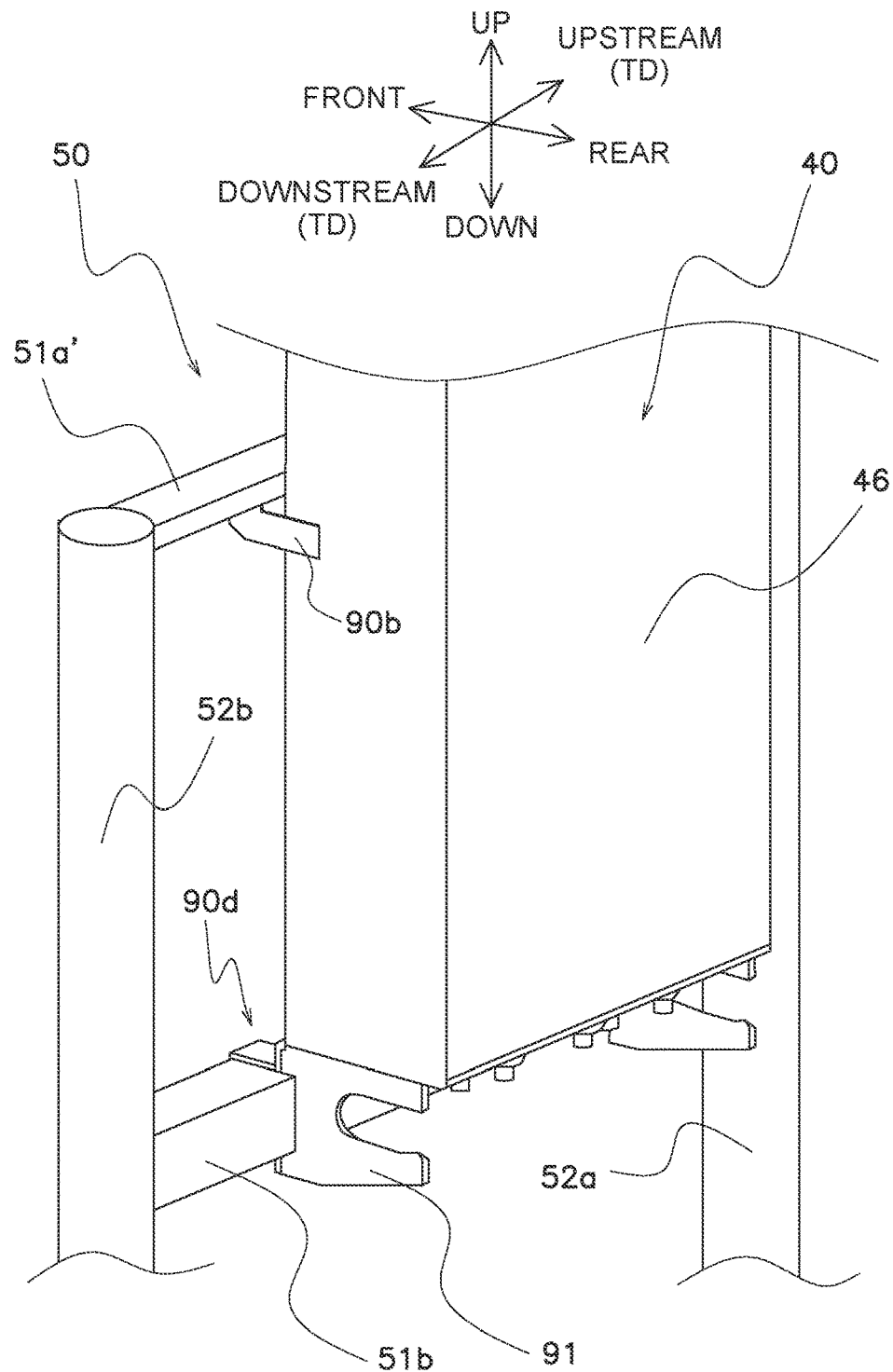
FIG. 10 is a drawing showing the body mounted to the frame by a method in example modification 1B.
Figure 13:
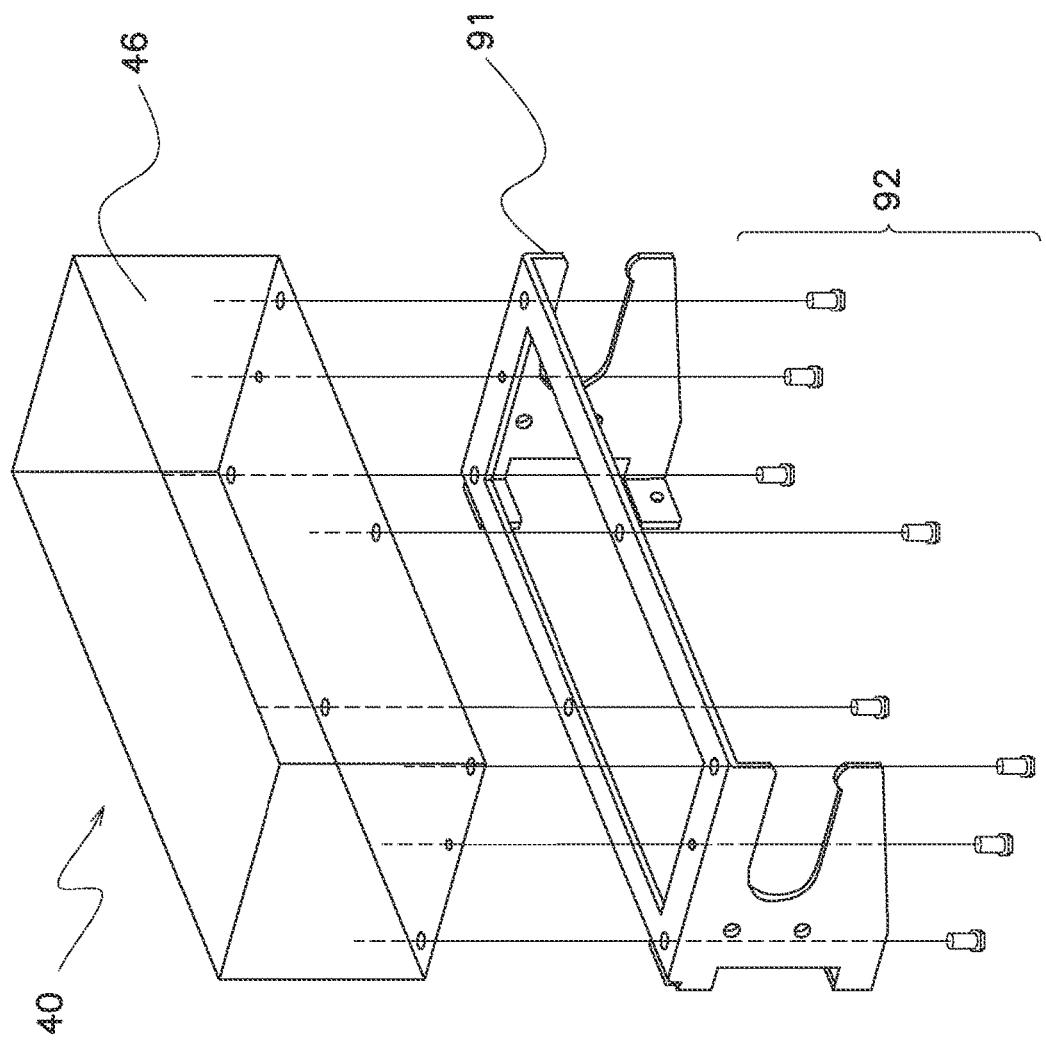
FIG. 13 is a drawing showing the method of mounting the body to the rail member in example modification 1B.
Figure 13:
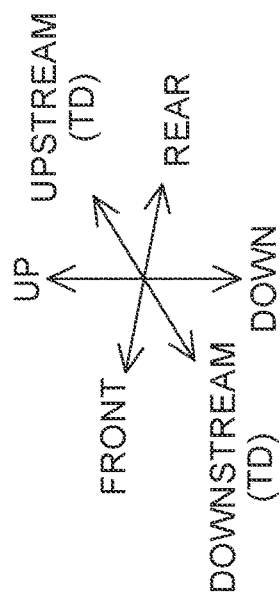

In the embodiment, the body 40 is mounted to the rail members 51*a*, 51*b* by the method shown in FIG. 3 and FIG. 4. However, the body 40 may also be mounted to the frame 50 by the method in this example modification. FIG. 10 is a drawing showing the body 40 mounted to the frame 50 by the method in this example modification. As shown in FIG. 10, the body 40 is mounted to the frame 50 in two places, on the upper side and on the lower side, as in the embodiment. As shown in FIG. 10, at the mounted portion on the upper side, the body 40 is mounted to a rail member 51*a*'. FIG. 11 is a drawing showing the method of mounting the body 40 to the rail member 51*a*' in this example modification. Furthermore, as shown in FIG. 10, at the mounted portion on the lower side, the body 40 is mounted to the rail member 51*b*. FIG. 12 and FIG. 13 are drawings showing the method of mounting the body 40 to the rail member 51*b* in this example modification.

(5-2-1) Mounted Portion on Upper Side

As shown in FIG. 10 and FIG. 11, at the mounted portion on the upper side, the trunk portion 46 of the body 40 is mounted to the rail member 51*a*' by anchors 90*a*, 90*b*.

In this example modification, the frame 50 has the rail member 51*a*' instead of the rail member 51*a* of the embodiment. The rail member 51a' has, in its undersurface, a groove that extends in the transport direction TD. In the groove in the rail member 51a' are mounted the pair of anchors 90a, 90b that are disposed upstream and downstream. FIG. 11 shows the method of mounting the anchor 90b to the rail member 51a'. The anchor 90b has a mounting member 90b1, a nut plate 90b2, screws 90b3, 90b4, and a nut 90b5. The screw 90b4 is welded to the mounting member 90b1. The nut plate 90b2 is inserted inside the rail member 51a' from downstream to upstream. The mounting member 90b1 is screwed to the inserted nut plate 90b2 by the screw 90b3 from below to above. The anchor 90b is screwed to the downstream side surface of the trunk portion 46 by the screw 90b4 and the nut 90b5 from downstream to upstream. The same also holds true for the anchor 90a. The anchor 90a has a mounting member 90a1, a nut plate 90a2, screws 90a3, 90a4, and a nut 90a5. The screw 90a4 is welded to the mounting member 90a1. In FIG. 11, the anchor 90a is already mounted to the rail member 51a'. It will be noted that FIG. 11 does not show the nut plate 90a2 and the screw 90a3. The anchor 90a is screwed to the upstream side surface of the trunk portion 46 by the screw 90a4 and the nut 90a5 from upstream to downstream.

(5-2-2) Mounted Portion on Lower Side

As shown in FIG. 10, FIG. 12, and FIG. 13, at the mounted portion on the lower side, the trunk portion 46 of the body 40 is mounted to the rail member 51b via a mounting bracket 91.

As shown in FIG. 12, the mounting bracket 91 is mounted to the rail member 51b by anchors 90c, 90d. The anchor 90c has a mounting member 90c1 and screws 90c2. The rail member 51b is sandwiched in the front and rear direction by the mounting bracket 91 and the mounting member 90c1. The mounting member 90c1 is screwed to the mounting bracket 91 by two screws 90c2 from front to back. It will be noted that FIG. 12 does not show the upper screw hole on the upstream side of the mounting bracket 91. The same also holds true for the anchor 90d. The anchor 90d has a mounting member 90d1 and screws 90d2. The rail member 51b is sandwiched in the front and rear direction by the mounting bracket 91 and the mounting member 90d1. The mounting member 90d1 is screwed to the mounting bracket 91 by two screws 90d2 from front to back. It will be noted that FIG. 12 does not show the two screw holes on the downstream side of the mounting bracket 91.

Furthermore, as shown in FIG. 13, the mounting bracket 91 is screwed to the trunk portion 46 of the body 40 by eight screws 92 from below to above. In the embodiment the mounting brackets 44a, 44b are welded to the undersurface of the trunk portion 46, but in this example modification the mounting bracket 91 is screwed to the undersurface of the trunk portion 46.

In the weight checker 100 of this example modification, the body 40 becomes slidable in the transport direction TD by loosening the anchors 90a to 90d that anchor the body 40 to the rail members 51a', 51b. The body 40 is held in position relative to the transport direction TD by tightening the anchors 90a to 90d. As a result, the body 40 can be easily adjusted to be slidable or fixed in position using the anchors 90a to 90d.

What is claimed is:

1. A weight checker comprising:
   a transport unit that transports products under inspection;
   a weighing unit that determines the weights of the products under inspection on the transport unit;
   a body that has a screen relating to the weighing performed by the weighing unit; and
   a frame to which the transport unit and the weighing unit are anchored,
   wherein the frame has rail members that extend in a transport direction of the transport unit, and
   the body is independent of the transport unit and the weighing unit and is mounted to the rail members in such a way that its position in the transport direction can be changed by sliding the body in the transport direction in a state in which the load of the body is applied to the rail members.

2. The weight checker of claim 1, wherein the body becomes slidable in the transport direction by loosening anchors that anchor the body to the rail members and becomes fixed in position relative to the transport direction by tightening the anchors.

3. The weight checker of claim 1, wherein the frame has, as the rail members, a first rail member and a second rail member that are disposed parallel to each other and one above the other.

4. The weight checker of claim 1, wherein the frame further has a support member that supports the transport unit and the weighing unit separately from the rail members.

5. The weight checker of claim 1, wherein the length of the rail members is greater than twice the length of the body in the transport direction.

6. The weight checker of claim 1, wherein the position of the body can be changed in the vertical direction of the body relative to the transport unit, the weighing unit, and the rail members.

* * * * *